J. F. LAMB.
BAIL EAR AND BAIL.
APPLICATION FILED JUNE 5, 1919
1,391,257.
Patented Sept. 20, 1921.
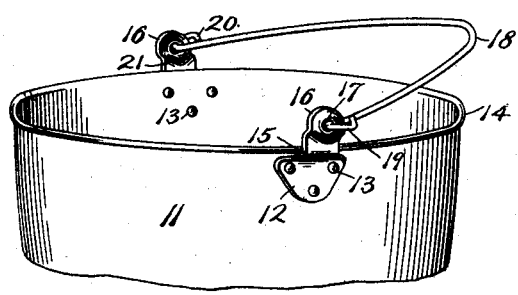
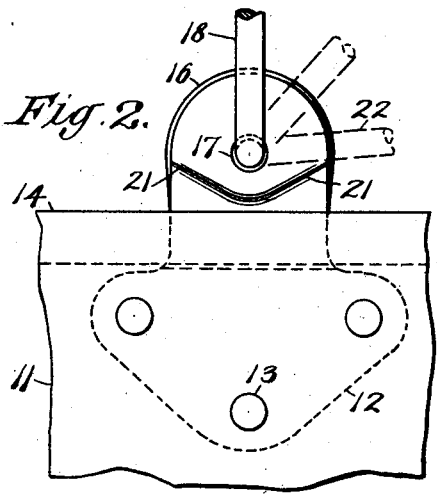
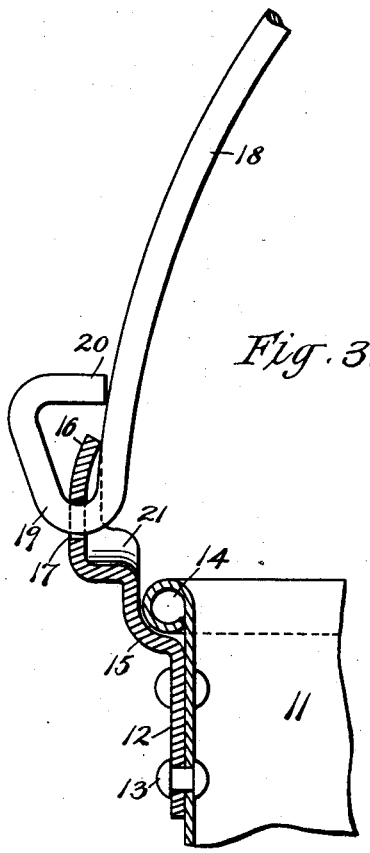
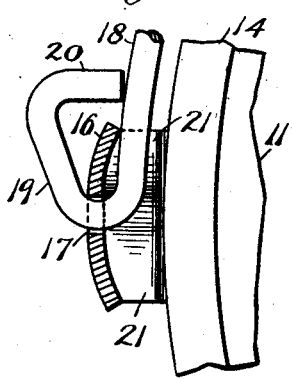
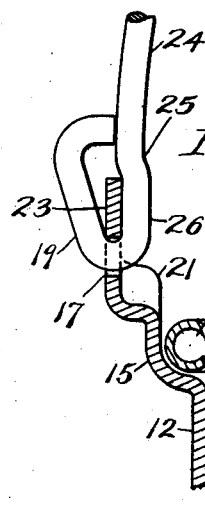
Inventor:
Joseph F. Lamb
by his Attys:

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

BAIL-EAR AND BAIL.

1,391,257.

Specification of Letters Patent.    Patented Sept. 20, 1921.

Application filed June 5, 1919. Serial No. 301,989.

*To all whom it may concern:*

Be it known that I, JOSEPH F. LAMB, a citizen of the United States, residing at New Britain, county of Hartford, and State of Connecticut, have invented certain new and useful Improvements in Bail-Ears and Bails, fully described and represented in the following specification and the accompanying drawings, forming a part of the same.

This invention relates to bail ears and bails.

In the use of articles having handles of the bail type, such, for example, as kettles, a bail with an unrestricted movement falls, as soon as freed by the user, against the rim or side of the kettle. When it is desired to use the handle again, to lift the kettle or the like, the removal of the bail from its position in contact with the kettle is a matter of considerable inconvenience, particularly if the kettle is hot.

Attempts have been made to control the movement of bails but they have been open to the objection that they are not self-acting; are not universal in their application; are complicated and expensive to manufacture, and the like.

It is an object of the present invention to provide bail ears and bail of such construction that the movement of the bail is self-controlled and limited. It is a further object of the invention to provide such a structure, that is simple in its construction and economical to manufacture.

With these general objects in view the invention consists in the new article of manufacture, the combinations, details of construction and arrangement of parts, which will first be described in connection with the accompanying drawing and then more particularly pointed out.

In the drawing,—

Figure 1 is a perspective view showing a pair of bail ears and bail constructed in accordance with the invention;

Fig. 2 is an enlarged view in elevation of one ear;

Fig. 3 is a view of the same in vertical section;

Fig. 4 is a view in longitudinal section; and

Fig. 5 is a view similar to Fig. 3 showing a modified construction.

Referring to the drawing, 11 represents a utensil such as a kettle adapted for use with a handle of the bail type.

The inventin includes a bail ear having a supporting portion which may be attached to the kettle. As here illustrated as an example, the supporting portion is a wing piece 12 which is secured to the outside of the kettle near the top thereof, by rivets 13. As the kettle illustrated has a rolled top edge 14, the ear, above the wing 12, is offset, as at 15, to accommodate the rolled edge 14.

The bail ear is also provided with a bearing portion for frictional engagement with the bail. Although the bearing portion is capable of various constructions, in the exemplification shown in Figs. 3 and 4, the bail ear is formed with an upright lug 16. This lug 16 is arcuate at the top and it is slightly dished with respect to its face, as appears in Figs. 3 and 4. Through the lug 16 is formed a pivot hole 17 for the bail when the bail is mounted in the ear, as hereinafter described. The lug portion 16 provides a bearing portion for frictional engagement with the bail to control the bail's movement, as will hereinafter appear.

The complete utensil has two of these bail ears, one for each end of the bail, and the two ears are preferably duplicates for economy in manufacture.

The invention includes, in combination with a pair of bail ears having bearing portions, a bail mounted in said ears to make frictional engagement with the bearing portions as the bail swings.

Although capable of various constructions, in the embodiment of the invention here illustrated there is provided a bail 18 formed of spring material, such as wire, and bent in the form of an arc to provide a suitable handle for lifting the kettle. To pivotally mount the bail in the bail ears, the bail, at each end, is bent outwardly to pass through the pivotal holes 17 in the bearing lugs 16 of the bail ears. Just beyond the ears, the ends of the bail are bent obliquely upwardly, as at 19, and then bent inwardly, as at 20, to terminate adjacent the handle portion, above the ears, as clearly shown in the drawing.

With the construction described, as the bail swings in its pivotal openings, the inherent outward spring of the end portions causes the bail to make frictional contact with the bearing portions provided by the lugs 16. This frictional engagement is sufficient to retain the bail in any position to which it may be moved but is not of such force as to interfere with normal use. In other words, gravitational movement of the bail is prevented so that if the bail is released in an upright position it does not fall into contact with the kettle but remains in the upright position.

It is noted that the retention of the bail in frictional engagement with the lugs 16 is aided by the construction of the bail as the oblique portions 19 by engaging the lugs 16 resist any tendency of the bearing portion of the bail to withdraw from the lugs.

In constructions embodying the invention in its entirety, there is provided means for limiting the movement of the bail in either direction. This may be accomplished, for example, by a two part stop shoulder on the bail ear.

Although capable of various constructions, in the present embodiment, the lug 16 of the bail ear is offset outwardly to provide a two part stop shoulder 21,—that is to say a shoulder extending on each side of the pivotal opening. In order to accommodate the opening 17 and at the same time to bring the stopping portions of the shoulder high enough to stop the bail in an elevated position, the shoulder is the form of a broad V as appears in Fig. 2. With the construction described the movement of the bail is limited to a given arc since, even if it is pushed downwardly by the user, it will engage the shoulder 21 on that side (as in dotted position 22 of Fig. 2) and it cannot be moved farther. The shoulder is preferably so positioned as to permit the bail to be swung down out of the way to permit the kettle to be packed away and the like, but at the same time to prevent the bail from being moved into contact with the kettle.

In Fig. 5 is illustrated a modified construction. Instead of the dished bearing lug 16 there is provided a flat upright lug 23, the inner face of which provides the bearing portion of the ear. In order to provide proper frictional engagement with lug 23, the bail 24 in this embodiment is staggered slightly as at 25 and has a short straight section 26 to correspond to the flat lug 23. As the bail swings the section 26 makes frictional engagement with the lug 23 and the bail is retained in the position to which it may be moved. This bail ear is also shown as having the two part stop shoulder 21 and the supporting wing 12.

Although various parts of the bail ear may be constructed and associated in various ways, it is noted that in the embodiment illustrated the ear comprises a single piece. Thus a bail ear is provided which combines a supporting wing, a bearing portion for contact with the bail, and a two part stop shoulder for limiting movement of the bail in a single piece. Furthermore it is noted that that part of the bail ear with which the bail makes frictional engagement is the part in which the pivotal hole is formed so that no extra parts are necessary. As a result, the bail ear shown is extremely simple and economical to manufacture.

What is claimed is:

1. As a new article of manufacture, a bail ear having an extended bearing portion for frictional braking engagement with the bail as the bail swings, whereby the bail may be frictionally held in the various positions to which it may be moved.

2. As a new article of manufacture, a one piece bail ear having a supporting wing for attachment to an article, an extended bearing portion for frictional braking engagement with the bail as the bail swings, whereby the bail may be frictionally held in the various positions to which it may be moved, and a two part stop shoulder for limiting the movement of the bail.

3. In combination, two bail ears having extended bearing portions, and a bail pivotally mounted in said ears to make frictional braking engagement with said bearing portions as the bail swings, whereby the bail may be frictionally held in the various positions to which it may be moved.

4. In combination, two bail ears having extended bearing portions, a bail pivotally mounted in said ears to make frictional braking engagement with said bearing portions as the bail swings, whereby the bail may be frictionally held in the various positions to which it may be moved, and a two part stop shoulder on each ear for limiting the movement of the bail in either direction.

5. In combination, two bail ears having extended bearing portions, a bail mounted in said ears to be held by its inherent resiliency in frictional braking contact with said bearing portions through the swinging movement of the bail, and means for limiting the movement of the bail in either direction.

6. As a new article of manufacture, a one-piece bail ear having a wing portion for attachment to an article, an extended bearing portion, offset from said wing portion, for frictional braking engagement with the bail as the bail swings, whereby the bail may be frictionally held in the various positions to which it may be moved, the connecting portion between the wing portion and the offset bearing portion providing a two part stop shoulder for limiting movement of the bail in either direction.

In testimony whereof, I have hereunto set my hand.

JOSEPH F. LAMB.